US008650980B2

(12) United States Patent
Lafer et al.

(10) Patent No.: US 8,650,980 B2
(45) Date of Patent: Feb. 18, 2014

(54) TRANSMISSION

(75) Inventors: Alois Lafer, Graz (AT); Mario Vockenhuber, Graz (AT); Jürgen Schranz, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 885 days.

(21) Appl. No.: 12/374,690

(22) PCT Filed: Aug. 6, 2008

(86) PCT No.: PCT/JP2008/002127
§ 371 (c)(1),
(2), (4) Date: Dec. 14, 2009

(87) PCT Pub. No.: WO2008/011943
PCT Pub. Date: Jan. 31, 2008

(65) Prior Publication Data
US 2010/0101351 A1 Apr. 29, 2010

(30) Foreign Application Priority Data
Jul. 24, 2006 (DE) .......................... 10 2006 034 153

(51) Int. Cl.
*F16H 57/04* (2010.01)
(52) U.S. Cl.
USPC ............................................. 74/467
(58) Field of Classification Search
USPC ............ 74/661, 665 R, 467, 665 F, 346, 364, 74/89.44, 665 G; 184/6.12, 11.1, 11.2; 475/206, 88
See application file for complete search history.

(56) References Cited

U.S. PATENT DOCUMENTS

| 2,811,048 | A | * | 10/1957 | Dence et al. | .................... | 74/360 |
| 3,601,515 | A | * | 8/1971 | Pelizzoni | .................. | 418/206.4 |
| 4,414,861 | A | | 11/1983 | Witt | | |
| 4,573,373 | A | * | 3/1986 | Shimizu et al. | ................. | 74/468 |
| 4,699,249 | A | * | 10/1987 | Fujiura et al. | ................ | 184/11.1 |

(Continued)

FOREIGN PATENT DOCUMENTS

| AT | 007 700 U1 | 7/2005 |
| DE | 36 00 871 A1 | 7/1987 |

(Continued)

OTHER PUBLICATIONS

German Search Result for German Patent Application No. 10 2006 034 153.8, dated Jan. 25, 2012, with English translation thereof.

*Primary Examiner* — Ha D Ho
*Assistant Examiner* — Jude Agendia
(74) *Attorney, Agent, or Firm* — Dickinson Wright PLLC

(57) ABSTRACT

The present invention relates to a transmission having a housing, having a first drive output shaft, having a second drive output shaft and having a clutch system for distributing a torque between the drive output shafts. At least two transmission components are operatively connected between the drive output shafts and generate lubricating oil pressure. A separate tube extends within the housing from the at least two transmission components to the clutch system in order to supply lubricating oil to the clutch system.

33 Claims, 10 Drawing Sheets

(56) References Cited

U.S. PATENT DOCUMENTS

| | | | |
|---|---|---|---|
| 4,841,803 A * | 6/1989 | Hamano et al. | 74/665 GE |
| 4,914,968 A * | 4/1990 | Diermeier et al. | 74/467 |
| 5,456,129 A * | 10/1995 | Tane et al. | 74/467 |
| 5,522,476 A | 6/1996 | Holman | |
| 5,615,789 A * | 4/1997 | Finkelstein et al. | 215/348 |
| 5,667,036 A * | 9/1997 | Mueller et al. | 184/6.12 |
| 5,704,863 A * | 1/1998 | Zalewski et al. | 475/88 |
| 5,875,691 A * | 3/1999 | Hata et al. | 74/661 |
| 6,516,789 B1 * | 2/2003 | Jones | 123/559.1 |
| 7,841,449 B2 * | 11/2010 | Nakamura et al. | 184/6.4 |
| 7,984,791 B2 * | 7/2011 | Taguchi et al. | 184/6.12 |
| 2001/0011616 A1 * | 8/2001 | Kageyama et al. | 184/6.12 |

FOREIGN PATENT DOCUMENTS

| | | |
|---|---|---|
| DE | 195 44 322 A1 | 6/1996 |
| DE | 101 16 455 A1 | 10/2001 |
| EP | 0 268 904 A2 | 6/1988 |
| EP | 0 268 904 B1 | 6/1988 |
| EP | 0 477 767 A2 | 4/1992 |
| EP | 0 490 548 A2 | 6/1992 |
| FR | 2 759 132 | 8/1998 |
| GB | 458379 A | 12/1936 |
| JP | 59-208265 A | 11/1984 |
| SU | 983361 | 1/1980 |
| WO | 2004/092639 A2 | 10/2004 |
| WO | 2005/115790 A1 | 12/2005 |
| WO | 2006/015394 A1 | 2/2006 |

\* cited by examiner

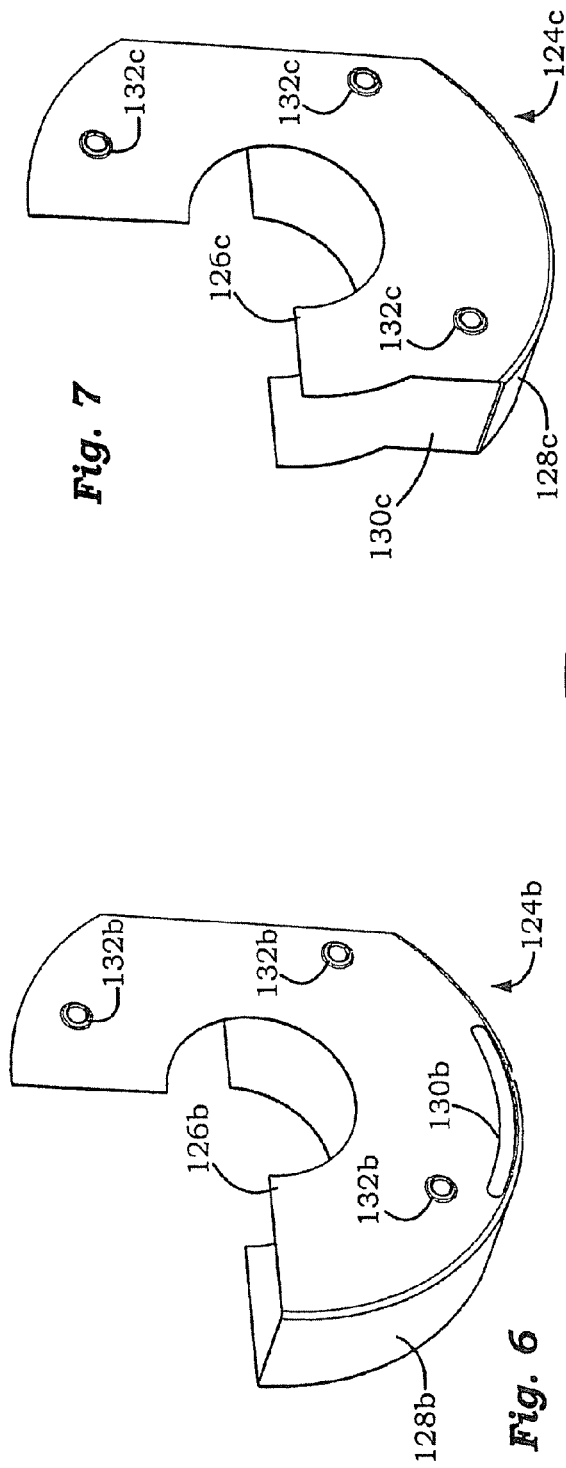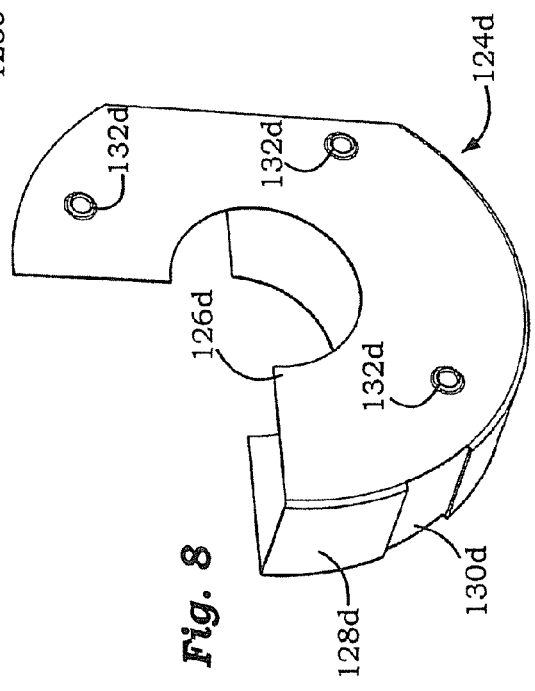

TRANSMISSION

CROSS-REFERENCE TO RELATED APPLICATIONS

This application is a 371 U.S. National Stage of International Application No. PCT/EP2007/005453, filed Jun. 20, 2007. This application claims the benefit of German Patent Application No. DE 10 2006 034 153.8, filed Jul. 24, 2006. The disclosures of the above application are expressly incorporated herein by reference.

FIELD

The present invention relates to a transmission having a housing, a first output shaft, a second output shaft as well as a clutch system for the distribution of a torque between the output shafts, wherein at least two transmission components are operatively connected between the output shafts and generate lubrication oil pressure.

BACKGROUND

This section provides background information related to the present disclosure and which is not necessarily prior art.

Transfer cases are used in all-wheel drive vehicles for the distribution of the torque to a plurality of axles. The distribution takes place by a multi-disk clutch which is made such that the torque transmission between a first output shaft and a second output shaft can be controlled. On engagement by means of a controllable multi-disk clutch, one speaks of "torque on demand".

The lubrication of transfer cases whose multi-disk clutch above all has a high cooling oil requirement in slip operation usually requires a separate oil supply. In addition, in particular on a blocking of the multi-disk clutch, the bearings which support the components of the multi-disk clutch are fully loaded, with the friction between the bearings and the components being at a maximum.

EP 0 268 904 B1 describes a transfer case having a transmission with a pump-less oil lubrication of a planetary gearset, wherein gears act as an oil pump to build up a specific pressure and wherein the lubrication oil is supplied to the planetary gearset through a passage and a gap between concentric shafts. The passage is integrated in the transmission housing. The transmission of EP 0 268 904 B1 thus does not have any direct oil lubrication of the multi-disk clutch and requires a complex and/or expensive housing design to form the passage.

SUMMARY

It is the object of the present invention to provide a transmission having improved efficiency, a simpler structure and improved oil lubrication properties.

Since the transmission of the invention delivers a pump-less oil lubrication, the transmission does not require any additional oil pump. In addition, the direct oil lubrication of the multi-disk clutch and of the supporting bearings improves the efficiency, in particular when the components are temperature loaded. The separate pipe additionally extends within the housing without the necessity of integrally forming a passage in the transmission housing. The transmission housing is simpler in this manner and requires less material and is thus lighter and cheaper.

In a first preferred embodiment of the invention, the pipe is coupled to the clutch system via a distributor element, with the distributor element conducting lubrication oil between the parts of the clutch system. The components of the clutch system are thus lubricated directly to improve the efficiency.

In a second preferred embodiment of the invention, one of the transmission components is a gear having cut-outs which are provided at at least one side surface of the gear. The lubrication oil is conducted through the cut-outs into the toothed arrangements of the gear to increase the lubrication oil pressure and thus to improve the lubrication oil supply.

In a third improved embodiment of the invention, a lubrication oil shield plate is provided which shields the transmission components with respect to the lubrication oil. The lubrication oil shield plate prevents the respective transmission components from permanently churning in the oil sump, whereby churning losses are reduced to a minimum. The temperature of the lubrication oil is reduced in this manner and the service life of the lubrication oil is extended. In addition, the viscosity of the lubrication oil is maintained for the better lubrication of the clutch system.

In a fourth preferred embodiment of the invention, a lubrication oil supply is provided with a pan, with the pan having a lubrication oil reservoir. The lubrication oil reservoir delivers additional lubrication oil to the transmission components.

Further areas of applicability will become apparent from the description provided herein. The description and specific example in this summary section are intended for purposes of illustration only and are not intended to limit the scope of the present disclosure.

DRAWINGS

The invention will be described in the following only by way of example with reference to the drawings; in which are shown:

FIG. 6 shows a perspective representation of a third embodiment of the oil shield plate;

FIG. 7 shows a perspective representation of a fourth embodiment of the oil shield plate;

FIG. 8 shows a perspective representation of a fifth embodiment of the oil shield plate;

DETAILED DESCRIPTION

Figure 1:
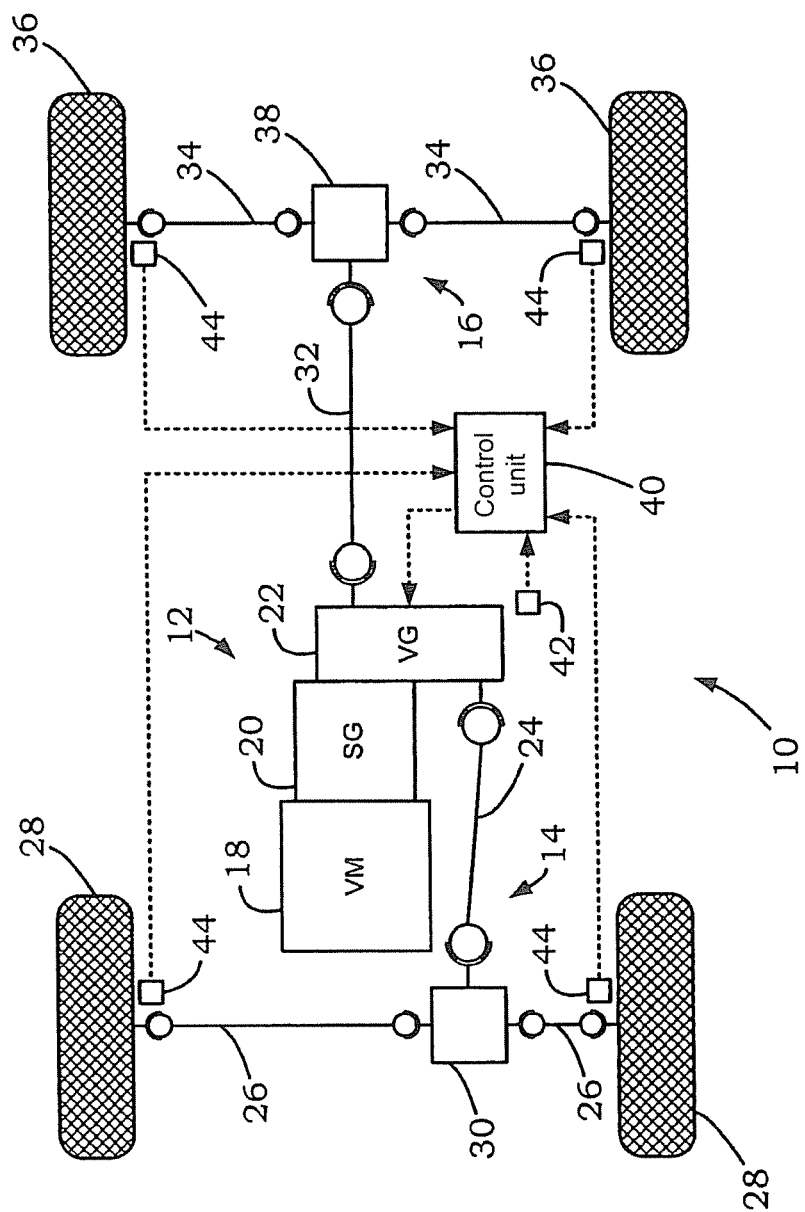
FIG. 1 shows a schematic representation of a motor vehicle powertrain equipped with a transfer case.

A schematic representation of a vehicle powertrain 10 is shown in FIG. 1 which includes a drive 12 which includes a first power transmission path 14, a second power transmission path 16, an internal combustion engine 18, a manual transmission 20 and a transfer case 22. The internal combustion engine 18 generates a driving torque which drives the transfer case 22 via the manual transmission 20. The transfer case 22 distributes the output torque of the manual transmission between the first and second power transmission paths 14, 16.

The first power transmission path 14 includes a Cardan shaft 24 which is driven by the transfer case 22, a pair of half-shafts 26 connected to a pair of wheels 28 and a differential unit 30 which is operative to transmit a driving torque from the Cardan shaft 24 to one or both half-shafts 26. In a similar manner, the second power transmission path 16 includes a Cardan shaft 32 which is driven by the transfer case 22, a pair of half-shafts 34 connected to a pair of wheels 36 and a differential unit 38 which is operative to transmit a driving torque from the Cardan shaft 32 to one or both half-shafts 34.

A control unit 40 controls the operation of the transfer case 22 on the basis of a plurality of vehicle parameters. The control unit 40 is electronically connected to at least one sensor and preferably to a plurality of further sensors. Exemplary sensors include a yaw rate sensor 42 and/or wheel speed sensors 44. The sensors 42, 44 detect a plurality of operating states, e.g. the yaw rate of the vehicle, the speed of each wheel and/or the speed of the vehicle. The control unit 40 processes the signal or signals and generates a control signal, with at least one actuator of the transfer case 22 being controlled on the basis of the control signal to distribute a torque between the power transmission paths 14, 16.

The components of a first embodiment of the transfer case 22 will now be described with reference to FIG. 2 and FIG. 3. The transfer case 22 includes a transmission housing 50, a first output shaft 52, a second output shaft 54, a multi-disk clutch 56, an actuator 58 and torque transmission components 60, 62, 64. The first output shaft 52 rotates around a first axis A and is driven directly by an output shaft, not shown, of the manual transmission 20. The second output shaft 54 rotates around a second axis B. The multi-disk clutch 56 is controllable to control a torque transmission between the first output shaft 52 and the second output shaft 54.

The transfer case 22 furthermore includes a clutch lubrication arrangement for the lubrication of the components of the multi-disk clutch 56 and of the supporting bearings. The clutch lubrication arrangement has a pressure chamber 66 integrally shaped in the transmission housing 50, a pipe 68 and a distributor element 70. The pipe 68 extends from the pressure chamber 66 to the multi-disk clutch 56 to supply lubrication oil from the pressure chamber 66 to the multi-disk clutch 56. The distributor element 70 conducts the lubrication oil to the different components and to the supporting bearings of the multi-disk clutch 56. The transfer element 70 in particular includes a plurality of openings 71 which distribute the supplied lubrication oil in different directions. The pipe 68 is preferably shaped of plastic and the distributor element 70 is preferably an injected molded part. As FIG. 3 shows, converging free spaces are formed with a spacing X and Y respectively in each case between the idler gear 62 and the second gear 64 as well as the transmission housing 50. The spacings converge in the direction of rotation of the respective gear and serve to regulate the lubrication oil conveying amount. The converging free spaces in particular act as nozzles to increase the lubrication oil pressure.

The torque transmission takes place by the torque transmission components which include a first gear 60, an idler gear 62 and a second gear 64. The first gear 60 is rotationally fixedly connected to a component of the multi-disk clutch 56 and is rotationally journaled around the first output shaft 52. The second gear 64 is rotationally fixedly connected to the second output shaft 54. The idler gear 62 is rotationally journaled within the transmission housing 50 and meshes with each of the first and second gears 60, 64. The idler gear 62 and the second gear 64 dip partly into the lubrication oil which is located in the transmission housing and whose level is indicated by the line SN.

Figure 2:
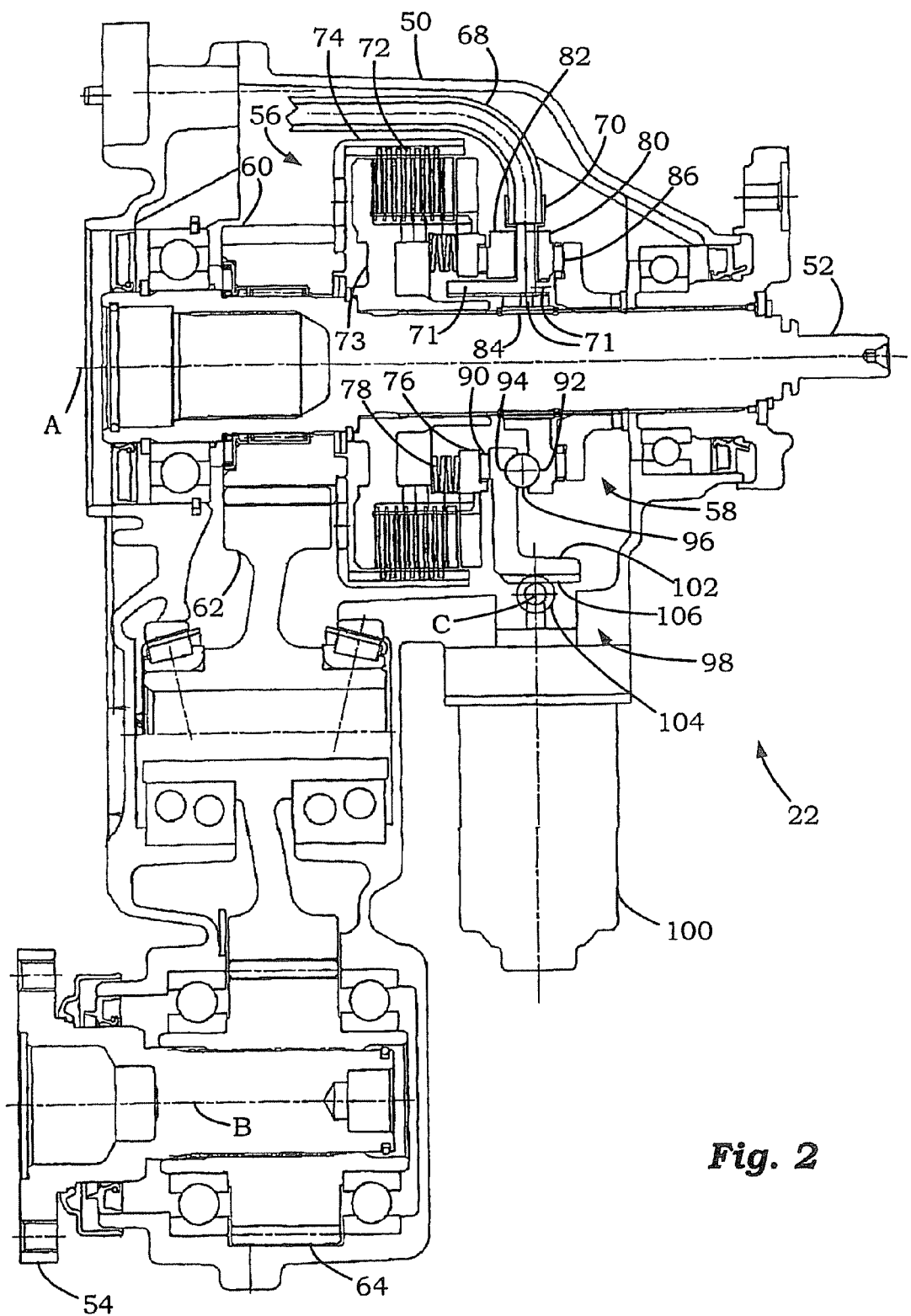
FIG. 2 illustrates a first sectional representation of a first embodiment of the transfer case.
Figure 3:
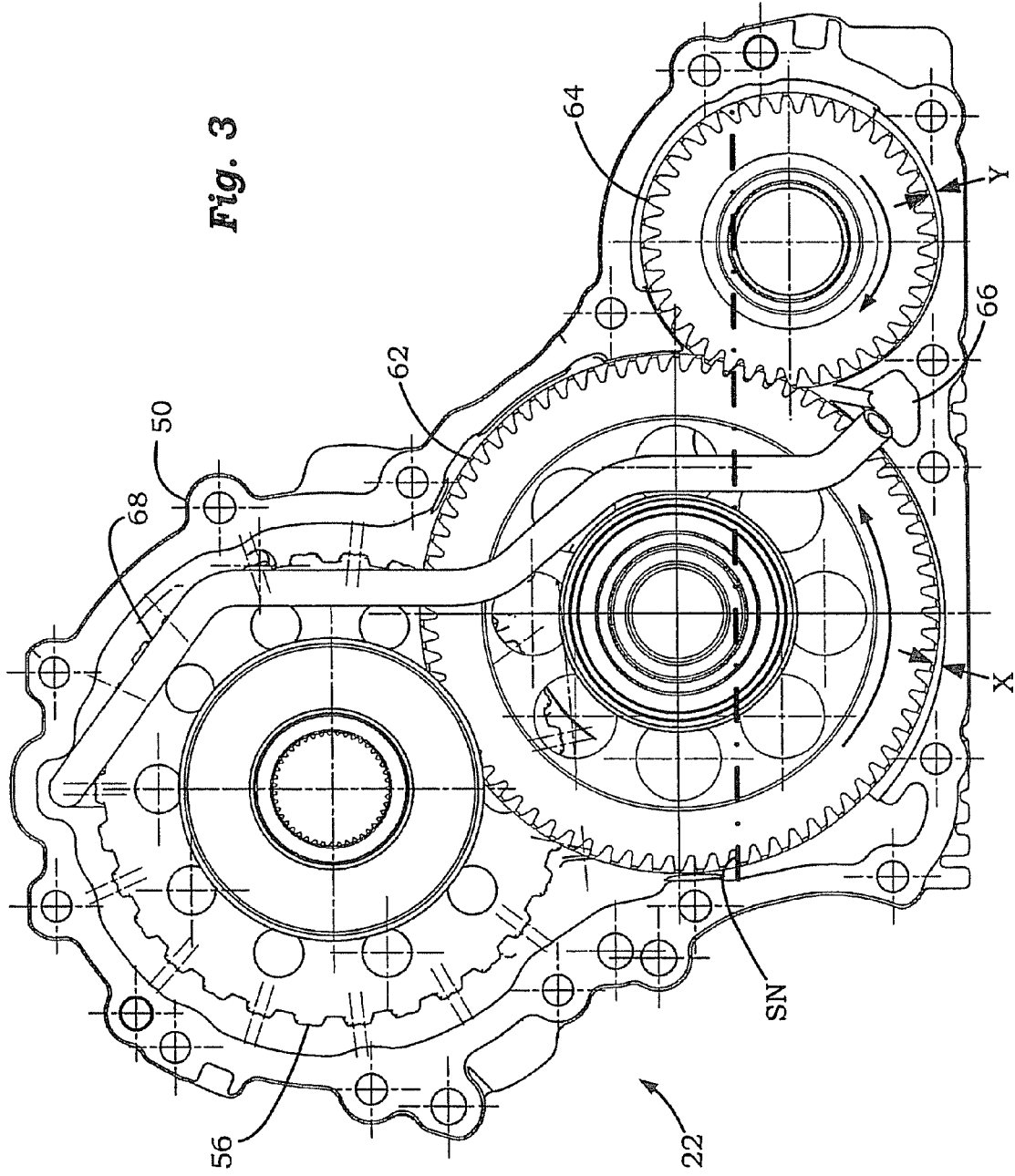
FIG. 3 illustrates a second sectional representation of the first embodiment of the transfer case.

With respect to FIG. 2, the multi-disk clutch 56 includes a clutch hub 73 which is rotationally fixedly connected to the first output shaft 52. The clutch hub 73 can be coupled with friction locking via respective friction disks 72 to a clutch basket 74 which is rotationally journaled around the first axis A of the multi-disk clutch 56 or of the first output shaft 52. The friction locking for the transmission of a torque between the clutch hub 73 and the clutch basket 74 is effected by means of a pressure plate 76 which is axially displaceable against the pre-stress of a plate spring arrangement 78 and hereby presses the respective friction disks 72 of the clutch hub 70 and the clutch basket 74 toward one another.

To selectively displace the pressure plate 76 against the pre-stress and to hereby actuate the multi-disk clutch 56, the actuator 58 includes a support ring 80 and an adjustment ring 82 which are arranged coaxially to one another and with respect to the axis A. The support ring 80 is rotationally fixed and held fixedly axially. For this purpose, the support ring 80 is supported at the first output shaft 52 or a section 88 by means of a radial bearing 84 and of an axial bearing 86 and the support ring 80 is held rotationally fixedly by shape matched connection to a securing section of the transmission housing (not shown). The adjustment ring 82 is rotationally and axially displaceably journaled and it is supported at the pressure plate 76 by means of an axial bearing 90.

The support ring 80 and the adjustment ring 82 each have a plurality of ball grooves 92 and 94 respectively at the mutually facing sides. Said ball grooves extend along the respective peripheral direction with respect to the axis A. A respective ball groove 92 of the support ring 80 and a ball groove 94 of the adjustment ring 82 stand opposite one another and hereby each surround an associated ball 96. The ball grooves 92, 94 are inclined with respect to the normal plane of the axis A, i.e. the ball grooves 92, 94 have a varying depth along the named peripheral extent. It is hereby achieved that a rotational movement of the adjustment ring 82 relative to the rotationally fixedly held support ring 80 results in an axial displacement of the adjustment ring 82 so that the pressure plate 76 is axially offset by such a rotational movement of the adjustment ring 82 and the multi-disk clutch 56 can hereby be actuated. The pre-stress effected by the plate spring arrangement 78 in this respect ensures that the respective ball 96 remains captured in the associated ball grooves 92, 94 in every rotational position of the adjustment ring 82 relative to the support ring 80.

To be able to bring about the explained rotational movement of the adjustment ring 82, it is coupled to an electric drive motor 100 via a gear drive 98. A toothed segment 102 which is made as an angular segment is shaped radially outwardly along a angular range of approximately 90° at the adjustment ring 82. This toothed segment 102 forms, together with a worm gear 104 of the drive motor 100, the gear drive 98. The teeth of the toothed segment 102 of the adjustment ring 82 can have a pitch angle with respect to the axis A of between 5° and 15°, for example. An axis C of the helical gear shaft 104 of the drive motor 100, on the one hand, and the axis A or the axis of rotation of the adjustment ring 82 with the toothed segment 102, on the other hand, intersect one another and form an axial angle of 90°.

The actuation of the shown multi-disk clutch 56 for the transmission of the torque between the first output shaft 52 and the second output shaft 54 takes place as follows:

By actuation of the drive motor 100, a corresponding rotational movement of the worm gear 104 around the axis C is effected. This results due to the gear drive 98 in a rotational movement of the adjustment ring 82 around the axis A. The slanted position of the teeth of the toothed segment 102 of the adjustment ring 82 is in this connection aligned such that the axial forces of the helical gear pair caused by the slanting toothed arrangement on the adjustment rig 82 in the direction of the desired movement of the adjustment ring 82 act to bring about the pressing actuation of the multi-disk clutch 56. The cooperation of the ball grooves 94 of the adjustment ring 82 via the respective ball 96 with the associated ball groove 92 of the support ring 80 has the effect during the rotational movement of the adjustment ring 82 that the adjustment ring 82 moves away axially from the support ring 80 and displaces the pressure plate 76 axially against the bias of the plate spring arrangement 78. The respective friction disks 72 of the clutch hub 70 and the clutch basket 74 are hereby pressed toward one another such that an increasing torque can be transmitted from the clutch hub 70 to the clutch basket 74. The release of the friction locking hereby effected takes place in the reverse order, i.e. the drive motor 100 causes the adjustment ring 82 to make a rotational movement in the reverse sense, with the corresponding axial movement of the adjustment ring 82 and the pressure plate 76 being supported in the direction of the support rig 80 by the plate spring arrangement 78.

On the torque transmission by the multi-disk clutch 56, the first gear 60 rotates around the axis A and drives the idler gear 62. The idler gear 62 thus drives the second gear 64 around the axis B. Normally, the gears 62, 64 have the direction of rotation reproduced by the arrows so that their portions dipping into the lubrication oil sump move with respect to one another. Pressure is generated in the toothed engagement by the conveying effect of the gears 62, 64 to effect a conveying of the lubrication oil via the pressure chamber 66, the pipe 68 and the distributor element 70 up to and into the actuator and the multi-disk clutch. In this connection, the components of the actuator 58, in particular the supporting bearings 84, 86, 90, and the components of the multi-disk clutch 56 are directly lubricated.

Figure 4:
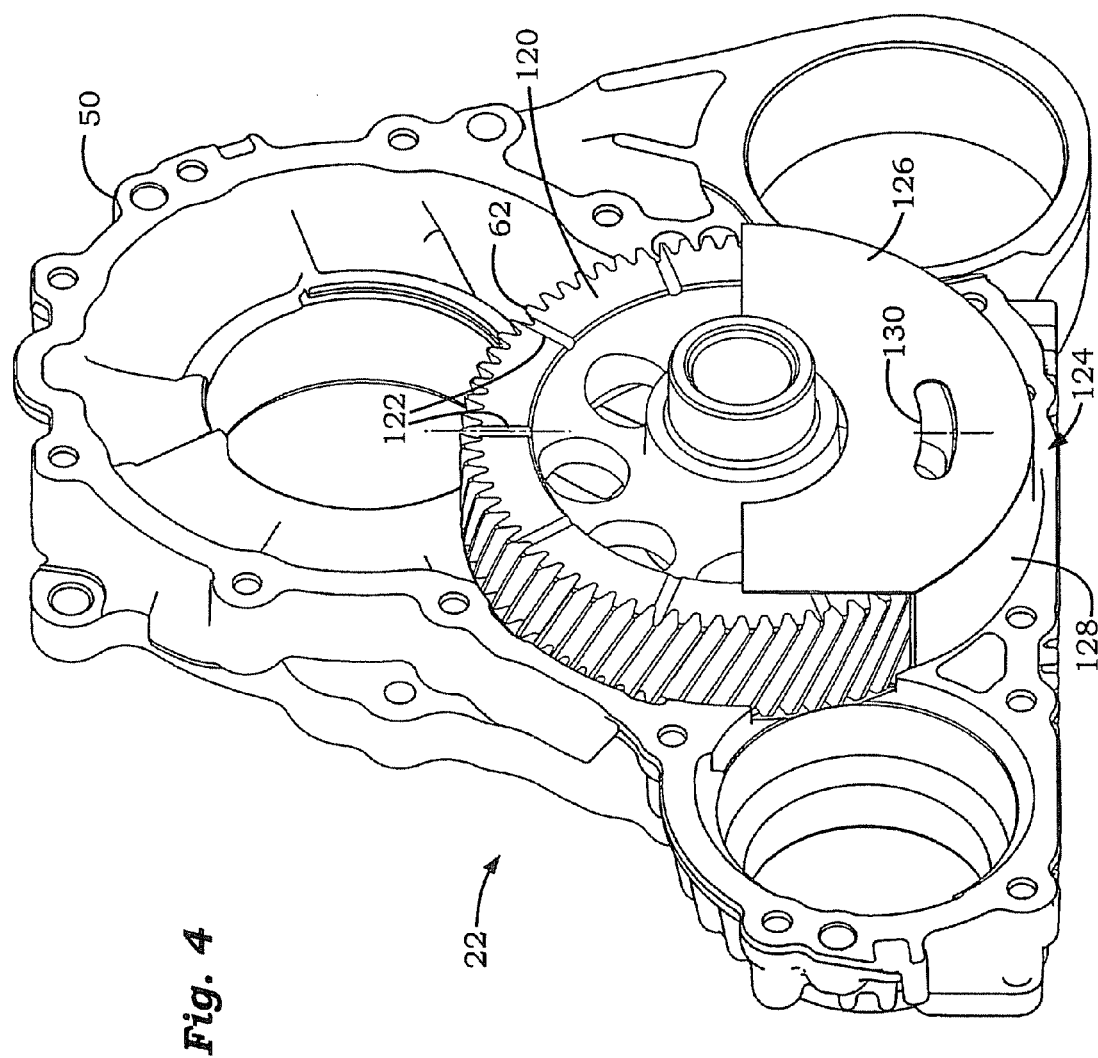
FIG. 4 shows a perspective representation of a housing a gear and a first embodiment of an oil shield plate of the transfer case.

As FIG. 4 shows, radially extending cut-outs 122 are provided in an end face 120 of the idler gear 62. Furthermore, a lubrication oil shield plate 124 is provided which approximately surrounds the lower half of the idler gear 62. The pan-shaped lubrication oil shield plate 124 has side walls 126 and a peripheral section 128 between the side walls 126 and serves for the reduction of temperature development and for the regulation of the lubrication oil conveying amount. The lubrication oil shield plate 124 in particular prevents the idler gear 62 from constantly churning in the oil sump in the transfer case 22. An unwanted foaming of the lubrication oil is hereby caused and the resulting churning losses result in an unwanted temperature increase specifically in the higher speed range and thus have to be reduced to a minimum.

Figure 5:
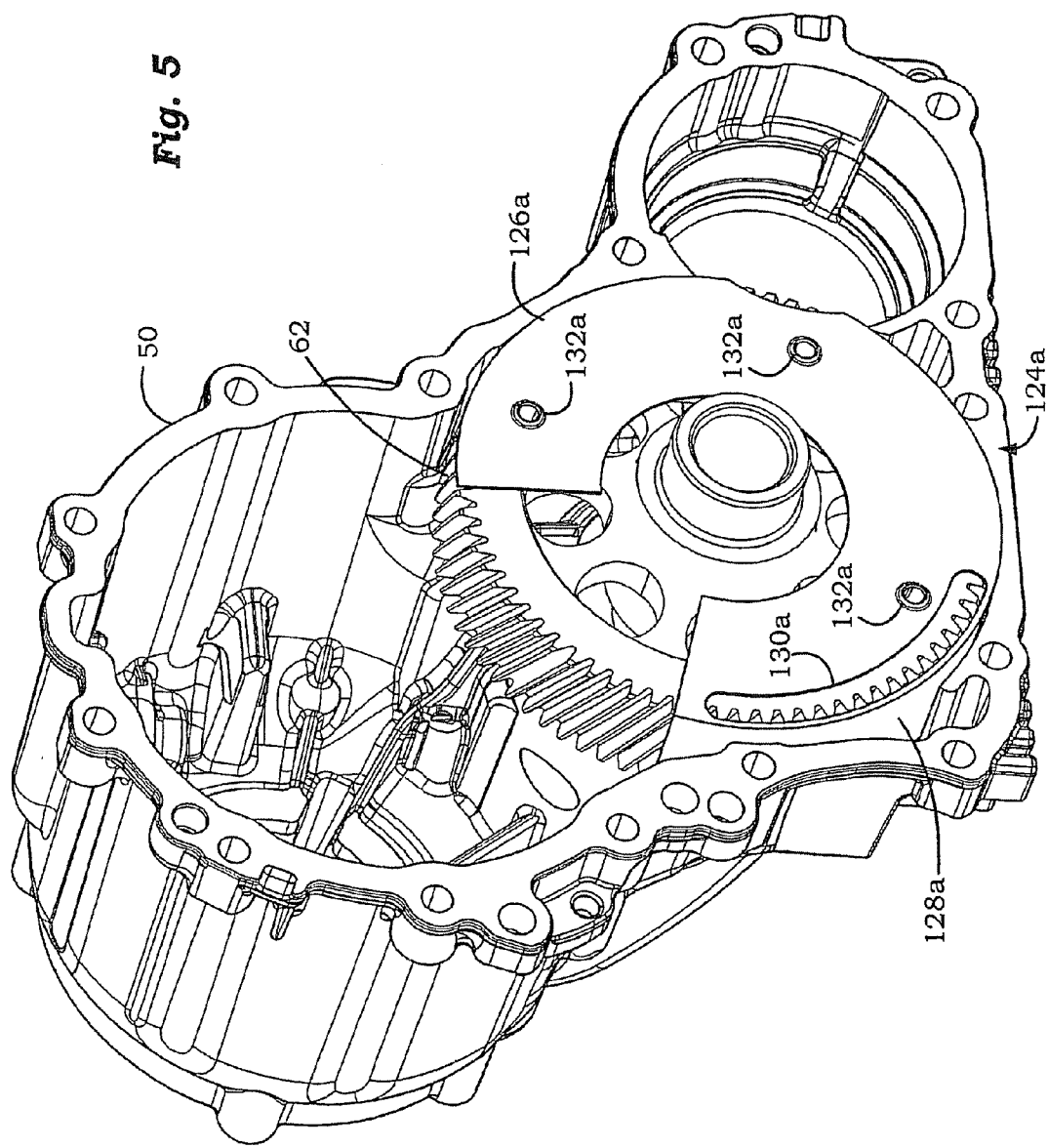
FIG. 5 shows a perspective representation of the housing, the gear and a second embodiment of the oil shield plate of the transfer case.

In the embodiment of the lubrication oil shield plate 124 shown in FIG. 4, openings are provided in the side walls 126, with lubrication oil flowing in via a curved elongate hole 130 which is formed in the side wall 126 and being conducted into the toothed arrangement of the gears via the cut-outs 122. In another embodiment shown in FIG. 5, the elongate holes 130a are formed at the edge between the side walls 126a and the peripheral section 128a. The lubrication oil shield plate 124a includes additional openings 132a in the side walls 126a which serve for the holding tight of the lubrication oil shield plate 124a within the transmission housing 50, with the openings 132a taking up projections, not shown, of the transmission housing 50.

FIGS. 6 to 8 show additional embodiments of the lubrication oil shield plate. The lubrication oil shield plate 124b of FIG. 6 is similar to the lubrication oil shield plate 124a of FIG. 5, but the elongate holes 130b are formed at the bottom between the side walls 126b and the peripheral portion 128b, with the elongate holes 130b lying completely within the lubrication oil sump. The lubrication oil shield plate 124c of FIG. 7 is similar to the lubrication oil shield plate 124 of FIG. 4, but made without openings in the side walls 126c. Instead, an opening 134c is provided in peripheral section 128c. The lubrication oil shield plate 124d of FIG. 8 is similar to the lubrication oil shield plate 124b of FIG. 6. Instead of openings in the side walls 126d, however, an intermediate opening 130d is provided in the peripheral section 128d.

Figure 9:
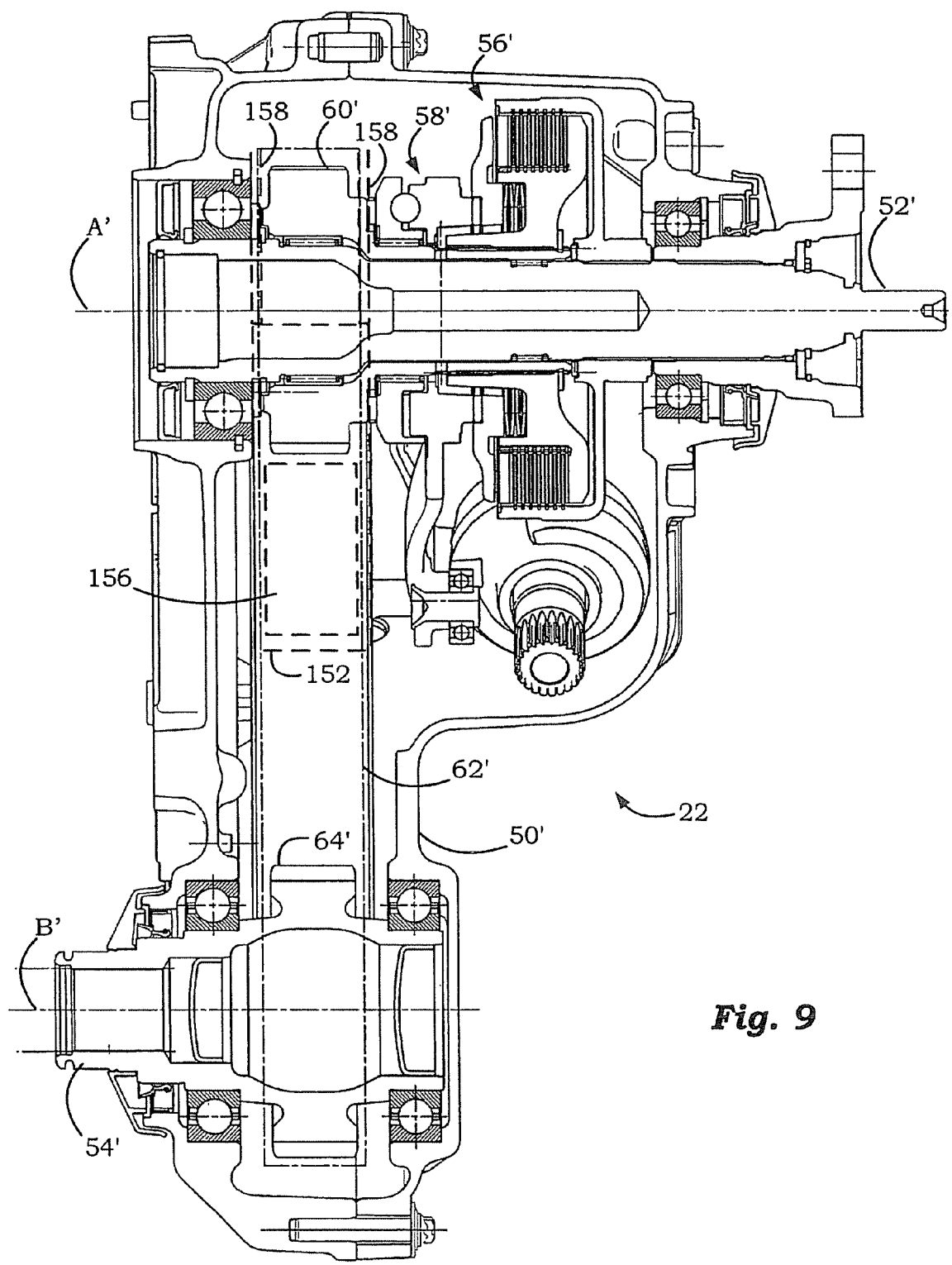
FIG. 9 illustrates a sectional representation of a second embodiment of a transfer case.
Figure 10:
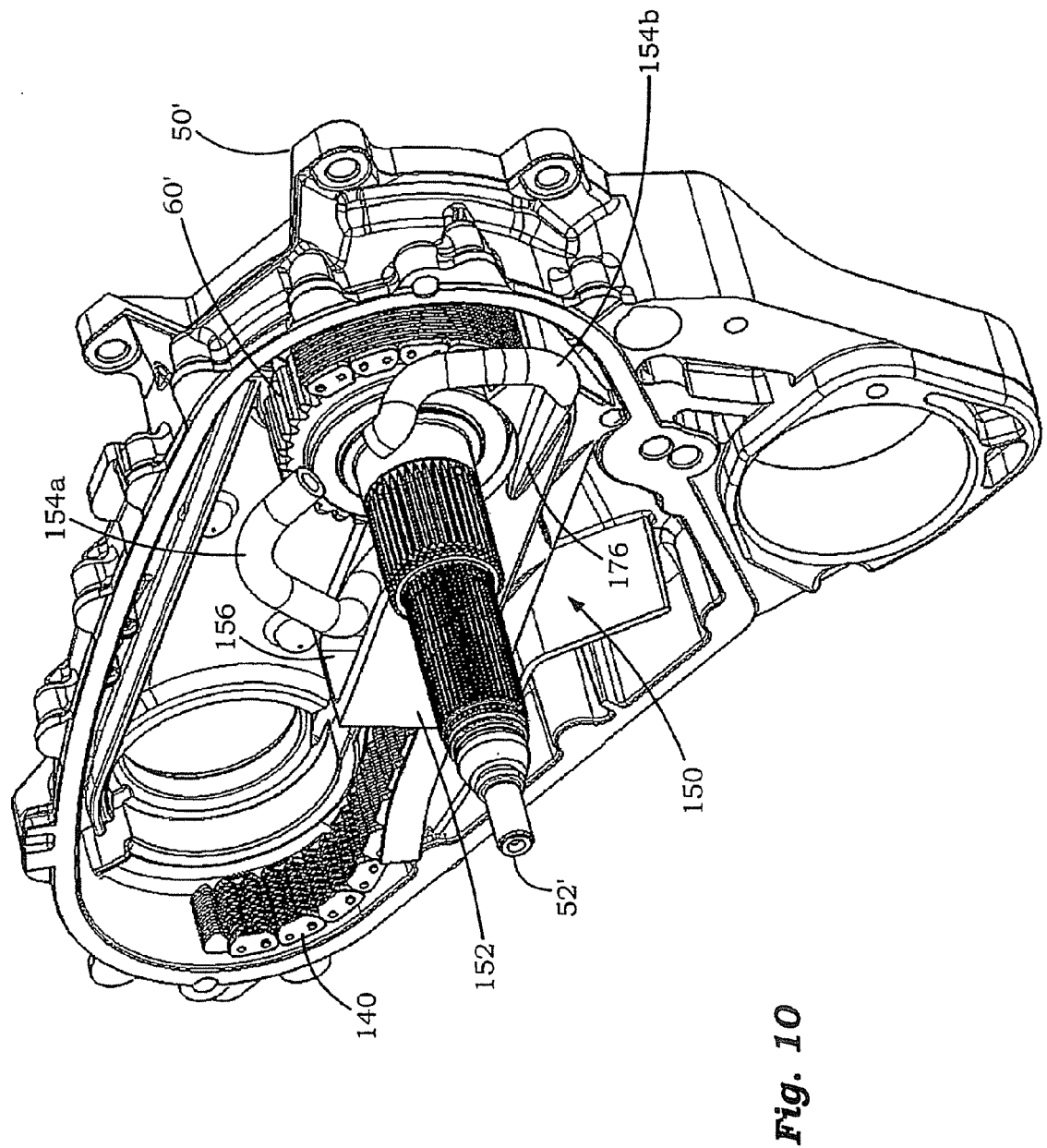
FIG. 10 shows a perspective representation of a housing, a gear, an output shaft and a clutch lubrication arrangement of the second embodiment of the transfer case.
Figure 11:
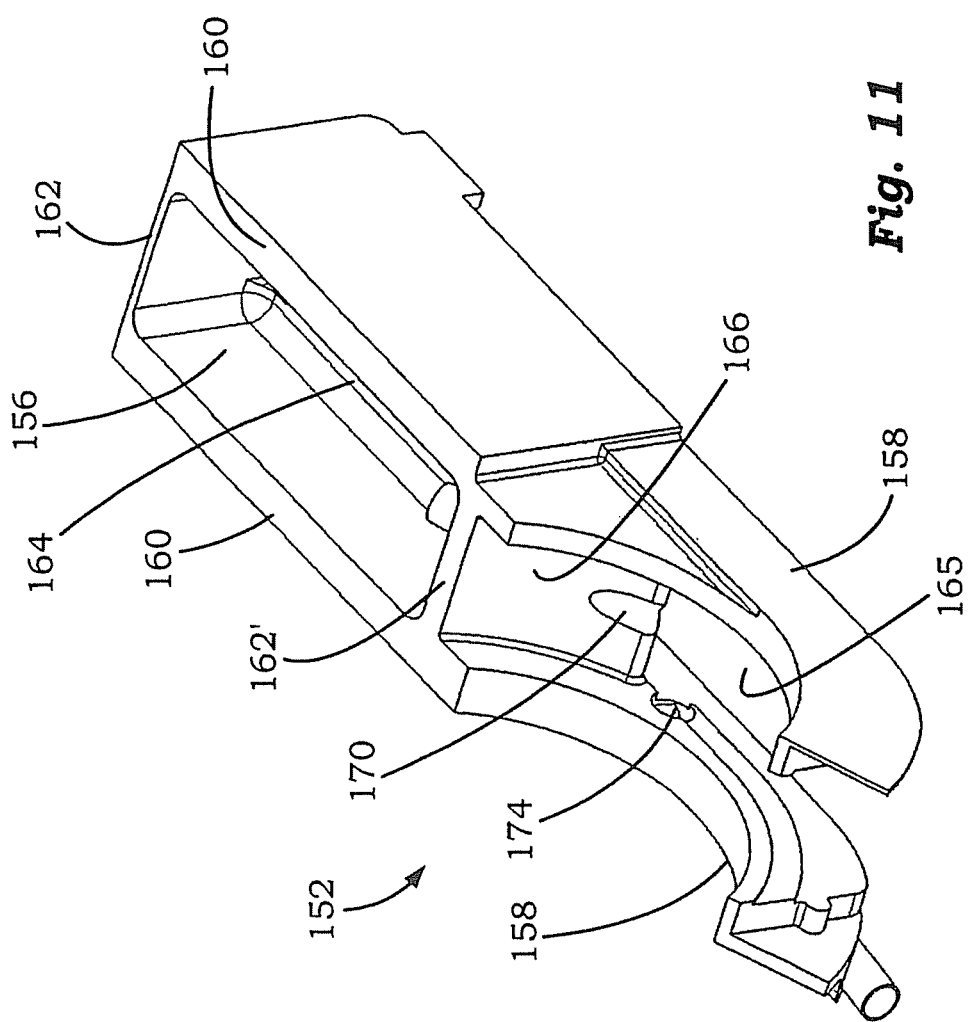
FIG. 11 shows a perspective representation of a lubrication oil supply of the clutch lubrication arrangement of FIG. 10.
Figure 12:
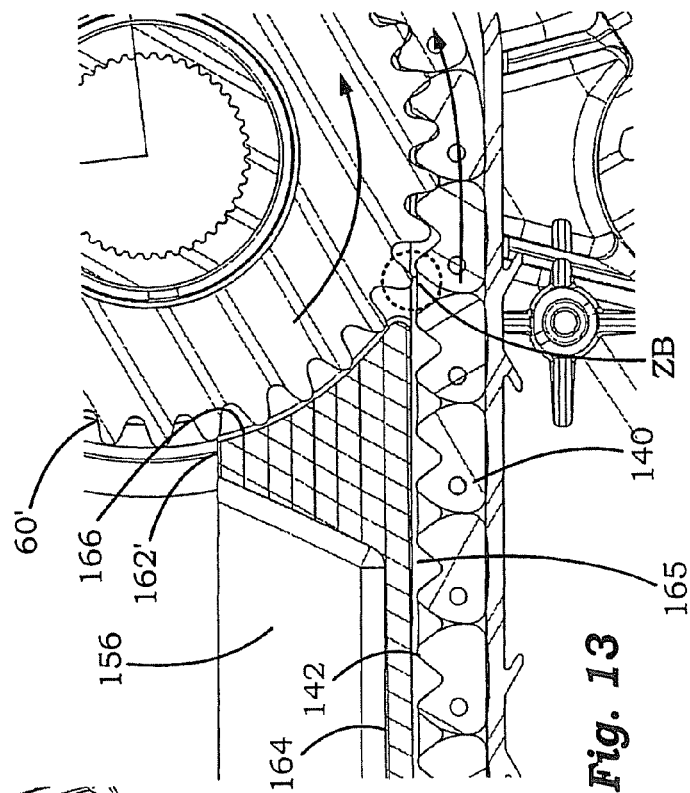
FIG. 12 shows a sectional representation of a first embodiment for the clutch lubrication arrangement of FIG. 10.
Figure 13:
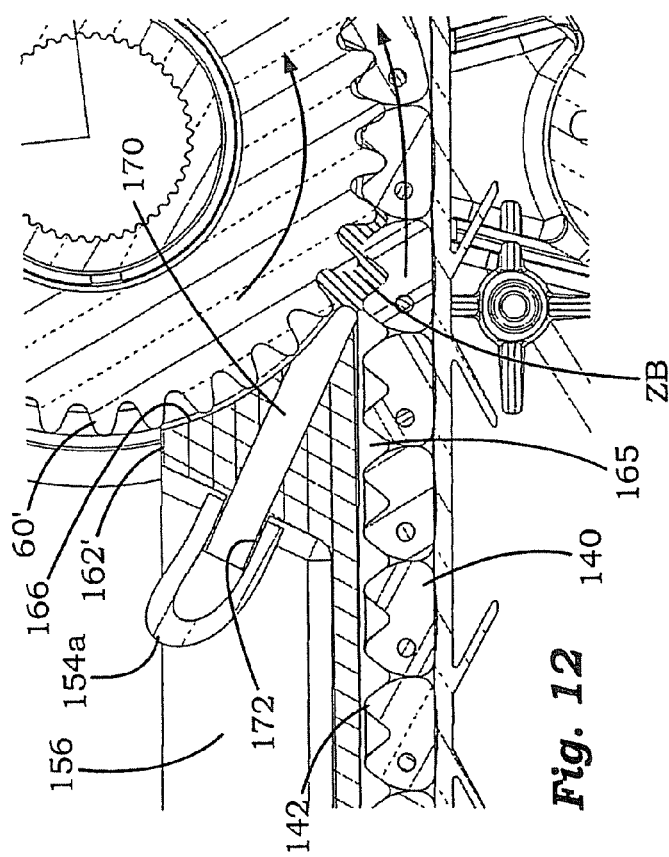
FIG. 13 shows a sectional representation of a second embodiment of the clutch lubrication arrangement of FIG. 10.

The components of a second embodiment of a transfer case 22' will now be described with reference to FIG. 9 and FIG. 10. The transfer case 22' includes a transmission housing 50', a first output shaft 52', a second output shaft 54', a multi-disk clutch 56', an actuator 58' and torque transmission components 60', 62', 64'. The first output shaft 52' rotates around a first axis A' and is driven directly by an output shaft, not shown, of the manual transmission 20. The second output shaft 54' rotates around a second axis B'. The multi-disk clutch 56' is controllable to control a torque transmission between the first output shaft 52' and the second output shaft 54'. In accordance with the second embodiment, the transfer case 22' is made as a chain gear, with the torque transmission component including gears 60', 64' which are rotationally operatively connected by a chain 62'. The chain 62' has a plurality of chain links 140 which form teeth 142 (FIGS. 12 and 13). The teeth 142 mesh with the teeth of the gears 60', 64'. The multi-disk clutch 56' and the actuator 58' each include components like the multi-disk clutch 56 and the actuator 58' respectively.

With reference to FIGS. 10 to 13, the transfer case 22' furthermore includes a clutch lubrication arrangement 150 for the lubrication of the components of the multi-disk clutch 56' and of the supporting bearings. The clutch lubrication arrangement 150 has a lubrication supply 152 and at least one pipe 154a, 154b. Although it is not shown, the clutch lubrication arrangement 150 can furthermore have a distributor element which distributes the supplied lubrication oil in different directions. The lubrication oil supply 152 is preferably an injection molded part and has a pan 156 having two arms 158 extending laterally. The pan 156 includes side walls 160, end walls 162, 162' and a base 164. The side walls 160 as well as the arms 158 form a chain path 165 through the chain 62' runs. The arms 158 and an arcuate surface 166 of the end wall 162' form a pocket which partly encloses the gear 60'.

The lubrication oil collects within the trough 156, whereby an additional lubrication oil sump is formed. The base 164 includes passages, not shown, through which lubrication oil is supplied to the chain 62'. The pan 156 has the task of catching the lubrication oil drawn up from the lubrication oil sump by the chain 62' and of immediately supplying it to the chain 62' again. That lubrication oil is thus captured again which is not immediately conveyed into the multi-disk clutch 56' through the pipe 154, 154b. The pan 156 thus serves for the improvement of the conveying power of the transfer case 22'.

In a first embodiment of the clutch lubrication arrangement 150, a passage 170 is formed through the end wall 162' and the surface 166. The pipe 154a is connected to a connection pipe 172 (FIG. 12) to establish flow communication between the lubrication oil supply 152 and the multi-disk clutch 56' and the actuator 58'. In a second embodiment of the clutch lubrication arrangement 150, a passage 174 is formed by an arm 158 with the pipe 154a being connected to a connection pipe 176 to establish flow communication between the lubrication oil supply 152 and the multi-disk clutch 56' and the actuator 58'.

The chain 62' carries lubrication oil upwardly out of the lubrication oil sump within the transfer case 22'. Normally, the gear 60' and the chain 62' have the direction of rotation reproduced by the arrows. Pressure is generated in the tooth engagement region ZB by the conveying effect of the gear 60' and of the chain 62' to effect a conveying of the lubrication oil via the pipe 154a and/or the pipe 154b up to and into the actuator 58' and the multi-disk clutch 56'. In accordance with the first embodiment of the clutch lubrication arrangement 150, the lubrication oil is conducted through the passage 170 and the connection pipe 172 up to the pipe 154a. In accordance with the second embodiment of the clutch lubrication arrangement 150, the lubrication oil is conducted through the passage 174 and the connection pipe 176 up to the pipe 154b.

Since the transfer case 22, 22' of the invention provides a pump-less oil lubrication, the transfer case 22, 22' does not require any additional oil pump. In addition, the direct oil lubrication of the multi-disk clutch 56, 56' and of the supporting bearings improves the efficiency, in particular when the components are temperature loaded. Individual parts of the oil lubrication system, for example the pipe 68, 154a, 154b, the distributor element 70 and the lubrication oil supply 152, can be made of plastic. The parts are thus easy and cheap to make. In addition the pipe 68, 154a, 154b extends within the housing 50, 50' without the need of forming a passage integrally in the transmission housing.

REFERENCE NUMERAL LIST 10 vehicle powertrain
12 drive
14, 16 power transmission path
18 internal combustion engine
20 manual transmission
22, 22' transfer case
24, 32 Cardan shaft
26, 34 half-shafts
28, 36 wheels
30, 38 differential unit
40 control unit
42, 44 sensors
50, 50' transmission housing
52, 52', 54, 54' output shaft
56, 56' multi-disk clutch
58, 58' actuator
60, 60', 64, 64' gear
62 idler gear
62' chain
66 pressure chamber
68, 154a, 154b pipe
70 distributor element
71 opening
72 friction disks
73 clutch hub
74 clutch basket
76 pressure plate
78 plate spring arrangement
80 support ring
82 adjustment ring
84, 86, 90 bearing
88 portion
92, 94 ball groove
96 ball
98 gear drive
100 drive motor
102 toothed segment
104 worm gear
120 end face
122 cut-outs
124, 124a-d lubrication oil shield plate
126, 126a-d side walls
128, 128a-d peripheral section
130, 130a-d elongate hole/opening
132a-d opening
140 chain links
142 teeth
150 clutch lubrication arrangement
152 lubrication oil supply
156 pan
158 arms
160 side walls
162, 162' end walls
164 base
165 chain path
166 surface
170, 174 passage
172, 176 connection pipe The foregoing description of the embodiments has been provided for purposes of illustration and description. It is not intended to be exhaustive or to limit the invention. Individual elements or features of a particular embodiment are generally not limited to that particular embodiment, but where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A transmission comprising:
a housing having a pressure chamber and an oil sump filled with lubrication oil;
a first output shaft;
a second output shaft;
a clutch system for distributing a torque between the output shafts;
a pump-less lubrication arrangement for conveying lubrication oil from the sump to the pressure chamber, the pump-less lubrication arrangement including at least two rotary transmission components operatively connected between the output shafts, wherein the at least two rotary transmission components are in meshed engagement such that rotation of the at least two rotary transmission components causes pressurized lubrication oil to be supplied to the pressure chamber in the housing; and
a separate pipe extending within the housing from the pressure chamber to the clutch system to supply the pressurized lubrication oil to the clutch system for lubricating components of the clutch system.

2. The transmission in accordance with claim 1, wherein the pipe is made of plastic.

3. The transmission in accordance with claim 1 wherein the pump-less lubrication arrangement further includes a distributor element fixed to the housing in proximity to the clutch system, and wherein pipe supplies the lubrication oil to the components of the components of the clutch system via the distributor element, the distributor element being configured to include a plurality of openings for conducting the lubrication oil between components of the clutch system.

4. The transmission in accordance with claim 3, wherein the distributor element is configured such that the openings are positioned to supply the lubrication oil to lubricate circumjacent bearings and friction disks of the clutch system.

5. The transmission in accordance with claim 3, wherein the distributor element is an injection molded part.

6. The transmission in accordance with claim 1, wherein one of the transmission components is a first gear having cut-outs provided on at least one side surface of the first gear, wherein another one of the transmission components is a second gear meshed with the first gear, and wherein the lubrication oil is conducted through the cut-outs in the first gear into the meshed teeth of the first and second gears for delivery to the pressure chamber.

7. The transmission in accordance with claim 6, wherein the cut-outs in the first gear extend in a radial direction.

8. The transmission in accordance with claim 1, further comprising a lubrication oil shield plate configured and positioned within the housing to shield one of the transmission components from the lubrication oil in the oil sump.

9. The transmission in accordance with claim 8, wherein the lubrication oil shield plate includes side walls and a peripheral section between the side walls.

10. The transmission in accordance with claim 8, wherein the lubrication oil shield plate has at least one opening that provides a defined lubrication oil supply.

11. The transmission in accordance with claim 8, wherein the lubrication oil shield plate is pan-shaped and at least partly surrounds one of the two transmission components.

12. The transmission in accordance with claim 1, wherein the transmission components include a first gear, a second gear meshed with the first gear, and a third gear meshed with the second gear.

13. The transmission in accordance with claim 12, wherein the first gear and the clutch system rotate around the same axis.

14. The transmission in accordance with claim 12, further comprising a lubrication oil supply member having a pan that partly surrounds the first gear, the pan having a lubrication oil reservoir.

15. The transmission in accordance with claim 14, wherein the separate pipe extends from the lubrication oil supply member to the clutch system.

16. The transmission of claim 1 wherein the at least two rotary transmission components include a first gear coupled to the first output shaft, a second gear coupled to the second output shaft, and an idler gear meshed with both of the first and second gears, wherein the meshed engagement of the second gear with the idler gear causes the pressurized lubrication oil to be supplied to the pressure chamber formed in the housing, and wherein a distributor element is fixed to the housing in proximity to the clutch system such that the pipe supplies that pressurized lubrication oil from the pressure chamber to the distributor element so as to supply the lubrication oil to components of the clutch system.

17. A transmission comprising:
a housing having a pressure chamber and an oil sump filled with a lubricant;
first and second output shafts rotatably supported by said housing;
a clutch assembly disposed between said first and second output shafts;
a pump-less lubrication arrangement for conveying the lubricant from the sump to the pressure chamber, the pump-less lubrication arrangement including a pair of meshed torque transmitting components rotatively driven by at least one of said first and second output shafts, said pair of meshed torque transmitting components being operable to generate and convey pressurized lubricant from said sump to said pressure chamber in response to rotation thereof; and
a lubrication oil shield at least partially surrounding at least one of said pair of torque transmitting components and having an opening providing fluid communication between said oil sump and said pressure chamber.

18. The transmission of claim 17, further comprising a lubrication pipe for conveying said lubricant from said pressure chamber to said clutch assembly.

19. The transmission of claim 17, wherein said oil shield includes a pair of sidewalls and said opening is formed in one of said sidewalls.

20. The transmission of claim 17, wherein said torque transmitting components include an idler gear meshed with a gear rotationally fixedly connected to said second output shaft.

21. The transmission of claim 17, wherein said oil shield is operable to prevent churning of said lubricant during rotation of said torque transmitting components.

22. The transmission of claim 17 wherein said torque transmitting components include an idler gear driven by said first output shaft, and wherein a gear driven by said second output shaft meshes with said idler gear such that lubricant is pressurized via rotation of said meshed idler gear and said gear and is conveyed to said pressure chamber.

23. The transmission of claim 17 further comprising a first gear fixed for rotation with said first output shaft and a second gear fixed for rotation with said second output shaft, wherein said torque transmitting component is an idler gear meshed with said first gear and said second gear, wherein the meshed engagement between said second gear and said idler gear causing lubricant in said oil sump to be drawn through said opening in said oil shield and pressurized prior to delivery to said pressure chamber, wherein a lubrication pipe conveys said pressurized lubricant from said pressure chamber to a distributor element fixed to said housing in proximity to said clutch assembly, and wherein said distributor element includes openings for conveying lubricant to separate components of said clutch assembly.

24. A torque transmission assembly, comprising:
a housing having a pressure chamber and an oil sump filled with lubrication oil;
first and second shafts rotatably supported by said housing;
a clutch for selectively transmitting torque from said first shaft to said second shaft, said clutch including a first clutch member rotationally fixedly connected to said first shaft and a second clutch member;
a torque transfer mechanism coupling said second clutch member to said second shaft and including a first rotary torque transmission component fixed to said second clutch member and having first teeth in meshed engagement with second teeth of a second rotary torque transmission component, and a third rotary torque transmission component fixed to said second shaft and having third teeth in meshed engagement with said second teeth of said second torque transmission component, and wherein said pressure chamber is located in said housing to be positioned adjacent to the location of meshed engagement between said second and third torque transmission components; and a pump-less lubrication arrangement for conveying said lubrication oil from said oil sump to said pressure chamber and including a lubrication oil shield surrounding a portion of said second torque transmission component and having an opening in fluid communication with said oil sump, wherein the meshed engagement between said second teeth of said second torque transmission component and said third teeth of said third torque transmission component causes said lubrication oil to be drawn through said opening and convey pressurized lubrication oil to said pressure chamber in response to rotation of said second and third torque transmission components.

25. The torque transmission assembly of claim 24 wherein said lubrication arrangement further includes a pipe for conveying said lubrication oil from said pressure chamber to a location in proximity to said clutch.

26. The torque transmission assembly of claim 24 wherein said first torque transmission component is a first gear, wherein said second torque transmission component is an idler gear which is meshed with said first gear, wherein said third torque transmission component is a second gear rotationally fixedly connected to said second shaft and which is meshed with said idler gear, and wherein said lubrication oil shield has a pair of side walls disposed on opposite sides of said idler gear.

27. The torque transmission assembly of claim 26 wherein said opening is formed in at least one of said side walls.

28. The torque transmission assembly of claim 26 wherein said lubrication oil shield further includes a peripheral wall section connecting said side walls, and wherein said opening is formed in said peripheral wall section.

29. The torque transmission assembly of claim 26 wherein said idler gear has cut-outs formed along at least one side surface such that lubrication oil flowing through said opening in said lubrication oil shield is conveyed via said cutouts into the meshed engagement between said idler gear and said second gear.

30. The torque transmission assembly of claim 26 wherein a converging free space is defined between said housing and the periphery of said idler gear which converges in the direction of rotation and which functions as a nozzle to increase the oil pressure of said lubrication oil delivered to said pressure chamber.

31. The torque transmission assembly of claim 24 wherein said clutch further includes a set of friction disks alternately coupled between said first and second clutch members, and an actuator for controllably regulating frictional engagement of said friction disks so as to regulate the value of torque transmitted from said first shaft through said clutch and torque transfer mechanism to said second shaft.

32. A transmission, comprising
   a housing;
   first and second shafts rotatably supported by said housing;
   a clutch having a first clutch component fixed for rotation with said first shaft, a second clutch component, and an actuator for releasably coupling said second clutch component to said first clutch component;
   a transfer assembly including a first gear rotatably supported on said first shaft and fixed for rotation with said second clutch component, a second gear fixed for rotation with said second shaft, and an intermediate idler gear in meshed engagement with said first and second gears; and
   a pump-less lubrication arrangement for conveying lubricant from a sump in said housing to said clutch, said lubrication arrangement including a pressure chamber formed in said housing adjacent to the location of meshed engagement between said idler gear and said second gear, a pipe having a first end in fluid communication with said pressure chamber and a second end, and a distributor element fixed to said housing in proximity to said clutch and in fluid communication with said second end of said pipe;
   wherein pressurized lubricant is generated by meshed engagement of said idler gear and said second gear in response to rotation therebetween, said pressurized lubricant is conveyed from said pressure chamber to said distributor element via said pipe and is distributed through holes in said distributor element to lubricate components of said clutch.

33. A transmission comprising:
a housing having a pressure chamber and an oil sump filled with a lubricant;
first and second output shafts rotatably supported by said housing;
a clutch assembly disposed between said first and second output shafts;
a distributor element fixed to said housing in proximity to said clutch assembly and having a plurality of lubricant discharge openings;
a first gear fixed for rotation with said first output shaft;
a second gear fixed for rotation with said second output shaft;
a torque transmitting component operable to generate and convey pressurized lubricant to said pressure chamber in response to rotation thereof;
a lubrication oil shield at least partially surrounding said torque transmitting component and having an opening providing fluid communication between said oil sump and said pressure chamber; and
a lubrication pipe for conveying pressurized lubricant from said pressure chamber to said distributor element such that lubricant is conveyed through said lubricant discharge openings in said distributor element to lubricate components of said clutch assembly;
wherein said torque transmitting component includes an idler gear meshed with said first gear and said second gear, wherein the meshed engagement between said second gear and said idler gear causes lubricant in said oil sump to be drawn through said opening in said oil shield and pressurized prior to delivery to said pressure chamber.

* * * * *